US012729096B2

(12) United States Patent
Mateo Mur

(10) Patent No.: US 12,729,096 B2
(45) Date of Patent: Sep. 8, 2026

(54) COMPACT ELECTROMECHANICAL ACTIVATION SYSTEM FOR A LIFT SAFETY DEVICE

(71) Applicant: DYNATECH, DYNAMICS & TECHNOLOGY, S.L., Pina de Ebro (ES)

(72) Inventor: Francisco de Asis Mateo Mur, Pina de Ebro (ES)

(73) Assignee: DYNATECH, DYNAMICS & TECHNOLOGY, S.L., Saragossa (ES)

( * ) Notice: Subject to any disclaimer, the term of this patent is extended or adjusted under 35 U.S.C. 154(b) by 0 days.

(21) Appl. No.: 18/861,489

(22) PCT Filed: May 26, 2022

(86) PCT No.: PCT/ES2022/070323
§ 371 (c)(1),
(2) Date: Oct. 29, 2024

(87) PCT Pub. No.: WO2023/187231
PCT Pub. Date: Oct. 5, 2023

(65) Prior Publication Data

US 2025/0296810 A1 Sep. 25, 2025

(51) Int. Cl.
*B66B 5/18* (2006.01)

(52) U.S. Cl.
CPC .................................... *B66B 5/18* (2013.01)

(58) Field of Classification Search
CPC .... B66B 5/18; B66B 5/22; B66B 5/04; B66B 5/06
See application file for complete search history.

(56) References Cited

U.S. PATENT DOCUMENTS

| | | | | |
|---|---|---|---|---|
| 9,663,327 | B2 * | 5/2017 | Terry | B66B 1/365 |
| 10,618,776 | B2 * | 4/2020 | Hu | F16D 59/02 |
| 11,235,950 | B2 * | 2/2022 | Sanchez Munoz | B66B 5/04 |
| 11,912,536 | B2 * | 2/2024 | Mateo Mur | B66B 5/22 |
| 2007/0107991 | A1 * | 5/2007 | Mateo Mur | B66B 5/18 187/351 |
| 2011/0088983 | A1 * | 4/2011 | Sirigu | B66B 5/22 187/373 |

(Continued)

FOREIGN PATENT DOCUMENTS

| | | | | |
|---|---|---|---|---|
| EP | 3929132 | A1 * | 12/2021 | B66B 5/18 |
| ES | 3 766 816 | A1 | 1/2021 | |

(Continued)

*Primary Examiner* — Michael A Riegelman
(74) *Attorney, Agent, or Firm* — ALBERT BORDAS, P.A.

(57) ABSTRACT

An activation system having a fixed protective plate (10) in which there are fixed drive means based on a reset coil (1) and a holding coil (2) and release means arranged in alignment, a mobile wedging means activated by the drive means, and wherein these mobile wedging means are arranged in parallel with respect to the drive means, one or two wedging rollers (6) according to if said roller is for a one-way safety gear system or for a two-way safety gear system, respectively. A compact system that can be adapted to the existing safety gear is achieved, wherein electromechanical drive is executed vertically, which saves in additional levers, susceptibility to failure is lower and the reset and holding coils are smaller.

3 Claims, 10 Drawing Sheets

(56) References Cited

U.S. PATENT DOCUMENTS

| | | | | |
|---|---|---|---|---|
| 2011/0308895 | A1* | 12/2011 | Shen | B66B 5/18<br>187/359 |
| 2016/0236904 | A1* | 8/2016 | Witczak | B66B 9/00 |
| 2017/0001835 | A1* | 1/2017 | Hu | F16D 65/16 |
| 2017/0066627 | A1* | 3/2017 | Hu | B66B 5/18 |
| 2017/0107078 | A1* | 4/2017 | Hu | B66B 5/04 |
| 2017/0129741 | A1* | 5/2017 | Hu | F16D 59/02 |
| 2017/0283216 | A1* | 10/2017 | Marvin | B66B 5/044 |
| 2017/0283217 | A1* | 10/2017 | Marvin | B66B 5/0031 |
| 2017/0291798 | A1* | 10/2017 | Hu | B66B 9/00 |
| 2018/0118516 | A1* | 5/2018 | Martí | B66B 5/22 |
| 2018/0162693 | A1* | 6/2018 | Hu | B66B 5/06 |
| 2018/0162694 | A1* | 6/2018 | Hu | B66B 5/22 |
| 2018/0327224 | A1* | 11/2018 | Billard | B66B 5/04 |
| 2019/0062113 | A1* | 2/2019 | Hu | B66B 9/00 |
| 2019/0330020 | A1* | 10/2019 | Sanchez Munoz | B66B 5/22 |
| 2019/0330021 | A1* | 10/2019 | Sanchez Munoz | B66B 5/04 |
| 2020/0031621 | A1* | 1/2020 | Khzouz | B66B 5/18 |
| 2020/0048042 | A1* | 2/2020 | Sanchez Munoz | B66B 5/18 |
| 2020/0071129 | A1* | 3/2020 | Ruhnke | B66B 1/3461 |
| 2020/0115189 | A1* | 4/2020 | Dube | F16D 63/002 |
| 2020/0130985 | A1* | 4/2020 | Ruhnke | B66B 5/22 |
| 2020/0198932 | A1* | 6/2020 | Hallikainen | B66B 7/044 |
| 2020/0207581 | A1* | 7/2020 | Sotoca | B66B 7/046 |
| 2020/0270098 | A1* | 8/2020 | Mustafa | B66B 9/00 |
| 2022/0250872 | A1* | 8/2022 | Mateo Mur | B66B 5/18 |
| 2022/0250873 | A1* | 8/2022 | Mateo Mur | B66B 5/18 |
| 2022/0363514 | A1* | 11/2022 | Russwurm | B66B 5/18 |
| 2023/0047036 | A1* | 2/2023 | Mateo Mur | B66B 5/22 |
| 2025/0296810 | A1* | 9/2025 | Mateo Mur | B66B 5/18 |

FOREIGN PATENT DOCUMENTS

| | | | | |
|---|---|---|---|---|
| ES | 2 887 940 | A1 | 12/2021 | |
| WO | WO-2021069760 | A1 * | 4/2021 | B66B 5/22 |

* cited by examiner

COMPACT ELECTROMECHANICAL ACTIVATION SYSTEM FOR A LIFT SAFETY DEVICE

OBJECT OF THE INVENTION

As established in the title of the invention, an object of the present invention relates to a compact electromechanical activation system for the safety gear of an elevator, forming an emergency stop assembly of smaller dimensions for an elevator and acting as an interface between an overspeed electronic detection system and an element in charge of stopping the elevator car in case of emergency.

The present invention is characterized by the special configuration and design of each of the parts of the mechanism such that the electromechanical fail-safe drive is arranged in a smaller volume, wherein the assembly thereof inside the longitudinal member of the frame is possible without protruding from the longitudinal member thereof.

The electromechanical activation system comprises a safety gear protective plate incorporating all the electromechanical drive elements in the vertical position for any type of elevator safety gear, i.e., progressive one-way, two-way or even instantaneous.

This vertical arrangement and configuration of elements on the protective plate itself causes the assembly to be compact enough for the safety gear assembly and its electromechanical drive to be received within the longitudinal member of the frame of the elevator.

Therefore, the present invention is comprised within the field of elevators, and particularly among the safety means used for stopping an elevator.

BACKGROUND OF THE INVENTION

There are certified and functional electromechanical safety gear on the market. Said safety gear must be used together with electronic governors which in turn are absolute position sensors. These electronic governors replace conventional mechanical governors, as well as the governor rope and its tension pulley.

In conventional mechanical systems, the governor rope activates the system safety gear. In the case of electronic systems, an electromechanical activation system is in charge of activating the safety gear. As discussed before, a spring is in charge of keeping the safety gear in the activation position, and a coil is in charge of keeping the safety gear in the non-activation position.

The activation assembly currently used consists of the use of a reset coil, a holding coil associated with a spring which is preloaded during normal operation waiting to be deployed in the event of a power failure and transmission means for transmitting drive to the wedging roller.

Said transmission means for transmitting the drive of the safety gear to the wedging roller are based on the use of levers and cams, which results in an increase in the necessary final dimensions, causing the electromechanical activation system to emerge from the longitudinal member wherein it is assembled. This part of the activation takes up a space in the chassis which may be a problem in some cases since it may collide with another element of the installation. In turn, it may represent a problem for the client because it forces said client to modify the chassis.

Moreover, the existing electromechanical safety gear and drive are complex in their design and manufacture; they furthermore require coils of a larger size and higher power.

In the state of the art is known the document ES 2 887 940 A1, which discloses a safety brake for an elevator, a lifting device comprising the safety brake, and a method of braking a lifting device by means of said safety brake. The present invention provides an alternative solution to current elevator safety gear electronic activation systems, without the need to incorporate a speed limiter, standing out for its reliability, robustness and applicability Therefore, an object of the present invention relates to overcoming the drawbacks of the state of the art by developing a compact electromechanical activation system for the safety gear of an elevator having a smaller final volume, which can be used in any type of safety gear given its versatility, developing a compact assembly such as the one described below.

DESCRIPTION OF THE INVENTION

An object of the present invention relates to a fail-safe compact electromechanical activation system or device for the safety gear of an elevator having smaller dimensions configuring an emergency stop device of an elevator which is based on the use of drive means associated with mobile wedging means which translate the drive into a wedging of a roller on a guide.

The drive means are preferably based on a coil, that is, a holding coil, which is preferably is a suction cup type coil, which is no longer receiving current at the time of activating the stop, causing the movement of the mobile wedging means of one or several interlock rollers such that they are positioned to cause the wedging of a guide.

The drive means and the mobile wedging means are aligned in a parallel manner and positioned parallel to the guide of the elevator such that, once the drive means are activated, the mobile wedging means move, driving a wedging roller in the movement thereof.

The compact electromechanical activation system for the safety gear of an elevator comprises:

- A fixed protective plate in which there are fixed drive means based on a reset coil and a holding coil and release means arranged in alignment.
- Mobile wedging means activated by the drive means, and wherein these mobile wedging means are arranged in parallel with respect to the drive means.
- One or two wedging rollers, according to if said roller is for a one-way safety gear system or for a two-way safety gear system, respectively.

Wherein all the above-mentioned means are arranged on the same vertical of a safety gear, eliminating accessories which increase the volume and complicate the installation.

If used in one-way safety gear, the compact electromechanical activation system for the safety gear of an elevator has the following particularities.

- The fixed protective plate is provided with a double bend defining an upper part and a lower part, such that the reset coil and the holding coil are fixed in the upper part, separated from one another, with a wedging spring being arranged on the holding coil, such that, when the holding coil is released from its power supply, the drive spring moves vertically.
- The mobile wedging means consist of a mobile protective plate placed in a parallel arrangement with respect to the lower part of the fixed protective plate, wherein said mobile protective plate has an upper bend which defines a horizontal surface (19), this horizontal surface being housed between the space defined by the reset coil and the holding coil, whereas the vertical segment has an elongated hole.

The wedging roller is arranged in the lower part of the fixed protective plate, wherein said wedging roller has a guiding shaft emerging through a guiding groove made in the fixed protective plate.

It furthermore has guiding means of the mobile protective plate with respect to the fixed protective plate for the vertical movement of the mobile protective plate with respect to the fixed protective plate.

If used in double roller two-way safety gear, the compact electromechanical activation system for the safety gear of an elevator greatly reduces the need for levers if compared to other solutions of the state of the art. This design has the following particularities:

The reset coil and the holding coil consist of a double solenoid coil which is in charge of withdrawing the rollers and keeping them in the non-locking position. One of the solenoids has a higher power than the other one and outputs the initial force of withdrawing the system for a second, less powerful solenoid to then retain the system indefinitely in the non-locking position.

The mobile wedging means consist of a pair of pivoting levers by means of a pulley system and connecting ropes wherein one of the pulleys of the pulley system is lifted by the release means, which causes a pivoting of the pivoting levers and, accordingly, the interlock rollers moving closer to the guide of the elevator.

Using a reset coil serves for being able to reduce the physical requirements, i.e., power and size of the holding coil or holding to enable resetting the drive, as well as to consume less during the time the spring is compressed waiting to be released.

As a result of the described features, there is developed a new electromechanical safety gear design that improves existing the electromechanical safety gear in the following aspects:

It is a compact activation system, so it can be more easily integrated into the frames of clients. The installation of this device does not require major modifications.

It is a system that can be adapted to elevator safety gear regardless of their type, i.e., one-way, two-way, progressive or instantaneous. Electromechanical elements of greater power can be used due to effort requirements, as the full height of a longitudinal member is available and no other elevator elements are involved The electromechanical drive is executed vertically, which saves in additional levers, compared with other configurations, and, therefore, the force is transmitted directly, without losing any of such force due to the mentioned levers.

Unlike electromechanical safety gear operating by means of a profuse use of levers, activation is direct since it is all located on the vertical of the safety gear. A mobile protective plate is in charge of positioning the drive roller in the different states.

By having fewer levers, articulations, etc., susceptibility to failure is lower since fewer parts are used. The fact that it has fewer parts also has an effect on product assembly in the shop, as well as on the installation thereof in the frame.

The reset and holding coils are smaller than those of a lever-based electromechanical safety gear since less force is needed if the action is direct. Since the coils are smaller, they consume less so it is a somewhat more efficient system than the previous systems.

The activation system is applicable in:

Instantaneous safety gear

One-way progressive safety gear

Two-way progressive safety gear (double roller or shoe)

Two-way progressive safety gear (a roller or shoe)

Unless otherwise indicated, all the technical and scientific elements used in the present specification have the meaning that is normally understood by a person skilled in the art to which this invention pertains. Methods and materials similar or equivalent to those described in the specification can be used when putting the present invention into practice.

Throughout the description and claims, the word "comprises", and its variants do not intend to exclude other technical features, accessories, components or steps. For those skilled in the art, other objects, advantages and features of the invention will be inferred in part from the description and in part from putting the invention into practice.

DESCRIPTION OF THE FIGURES

To complement the description that is being made and for the purpose of better understanding the features of the invention according to a preferred practical embodiment thereof, a set of drawings is attached as an integral part of said description in which the following is depicted in an illustrative and non-limiting manner.

PREFERRED EMBODIMENT OF THE INVENTION

In view of the figures, a preferred embodiment of the proposed invention is described below.

Figure 1:
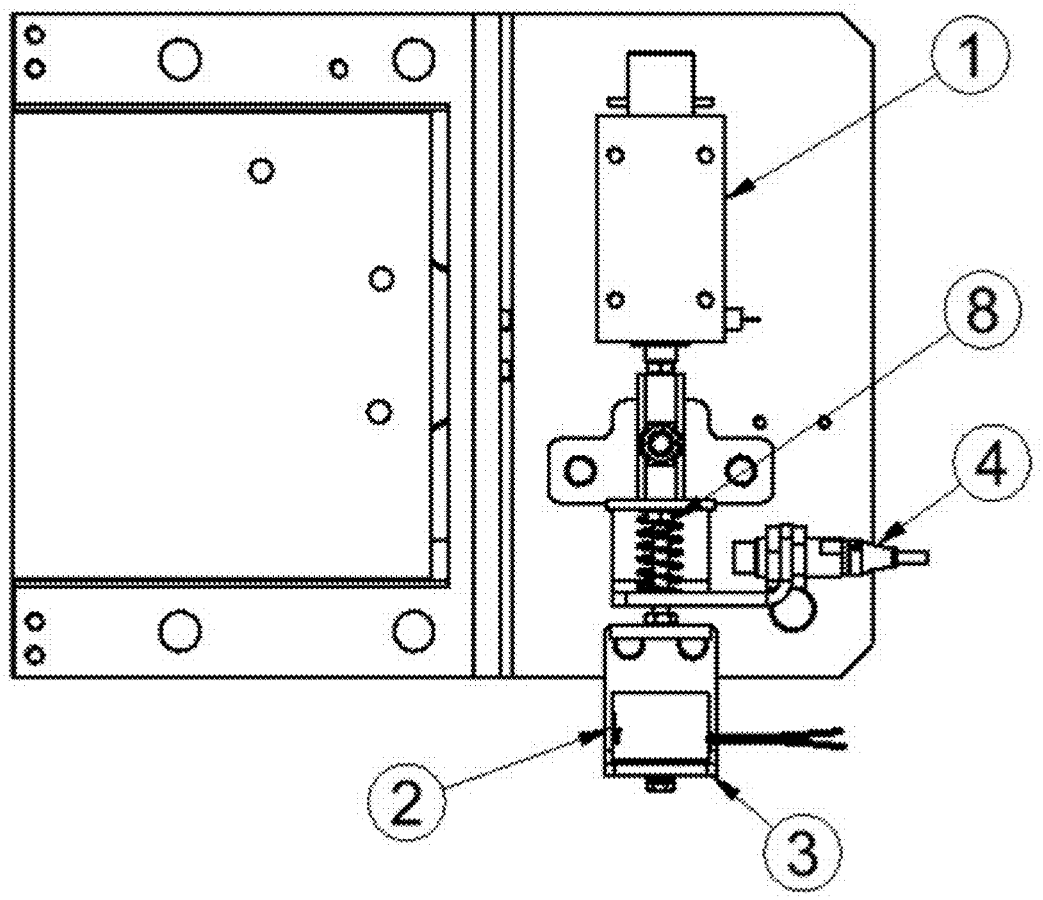
FIG. 1 shows a front view of the one-way electromechanical drive assembly of the state of the art.
Figure 2:
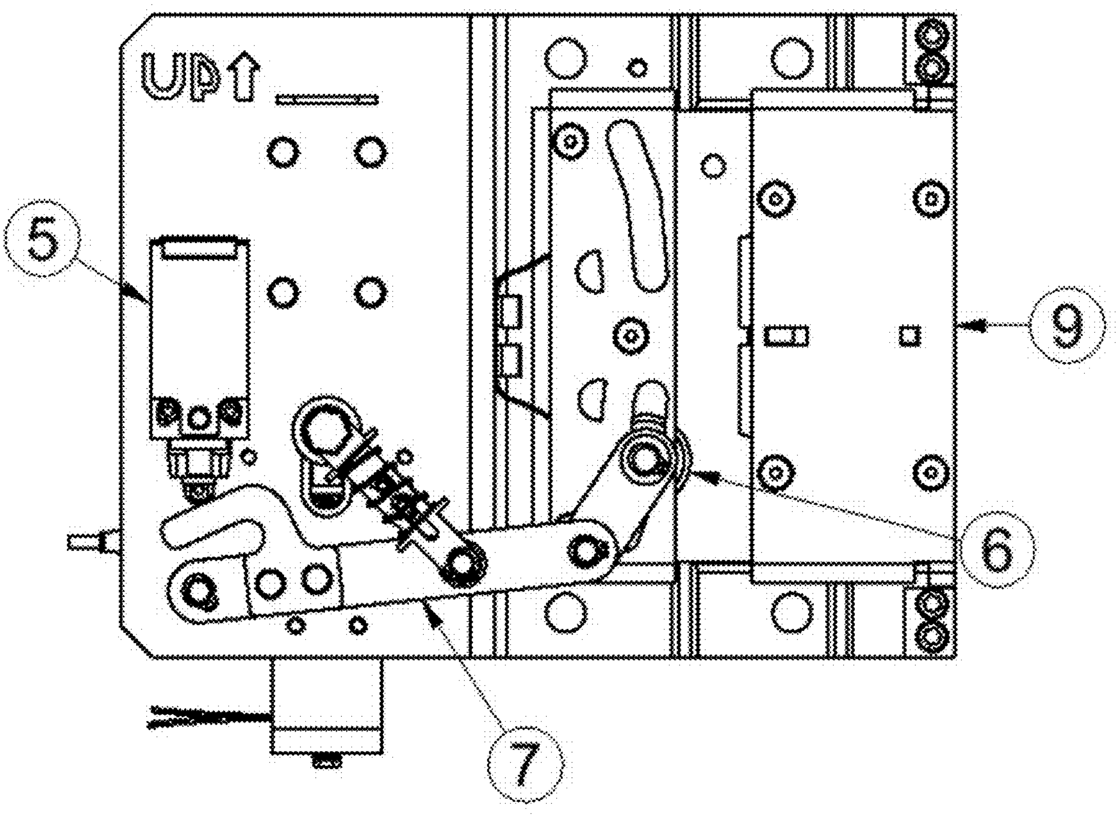
FIG. 2 shows a rear view of the same assembly mentioned above of the state of the art.

FIGS. 1 and 2 show front view and rear view, respectively, of an electromechanical one-way safety gear of the state of the art.

Said safety gear comprises a reset coil (1) which compresses a wedging activation spring (8) on a holding coil (2) fixed on a support (3), wherein once the spring is compressed, the holding coil (2) holds the activation spring (8) waiting to be activated by means of the loss of the power supply of the holding coil (2). The movement of the activation spring (8) is controlled by means of an inductive monitoring sensor (4).

FIG. 2 shows the rear face, and it can be seen how the movement of the activation spring (8) is transmitted to a wedging roller (6) by means of a series of levers (7) associated with a limit switch (5), where the mechanical safety gear (9) can be observed on said rear face.

Figure 3:
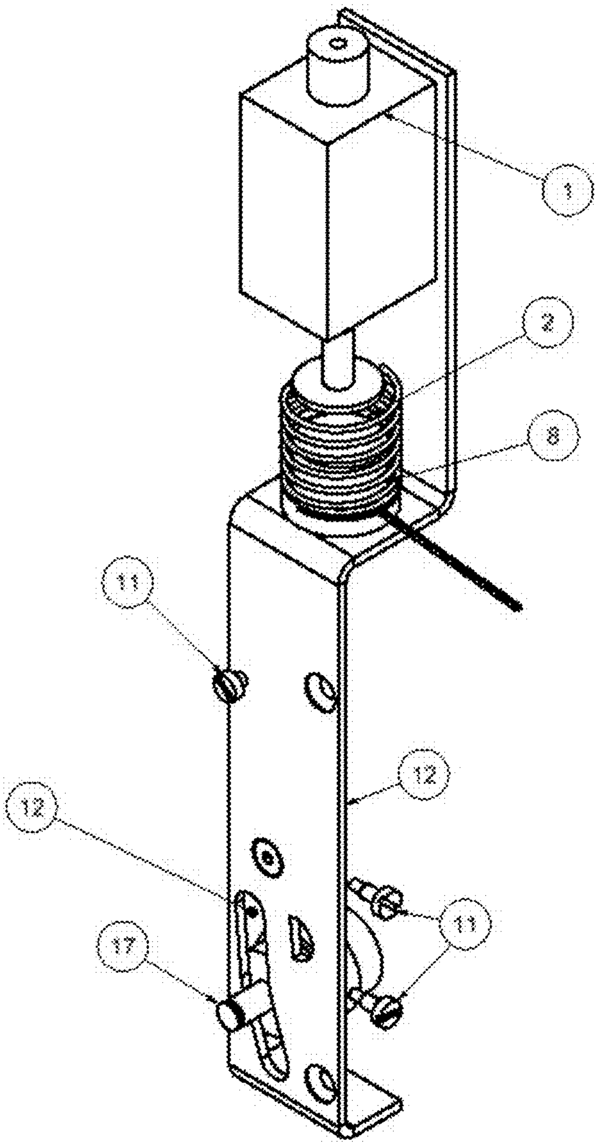
FIG. 3 shows an electromechanical activation system for one-way safety gear in which the mobile protective plate has been removed.
Figure 4A:
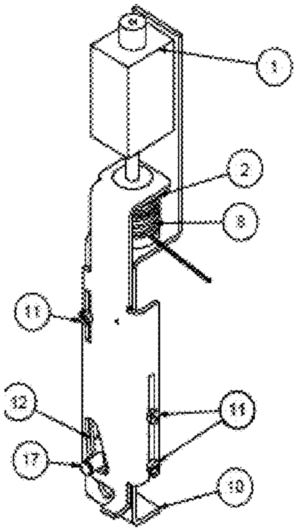
FIG. 4 shows different views of the activation system in the roller interlock position.
Figure 4B:
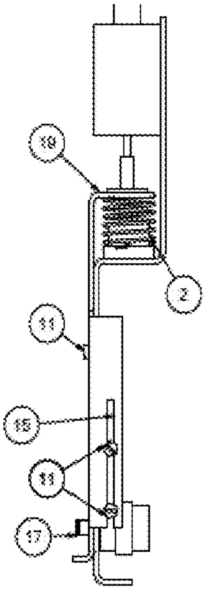
Figure 4C:
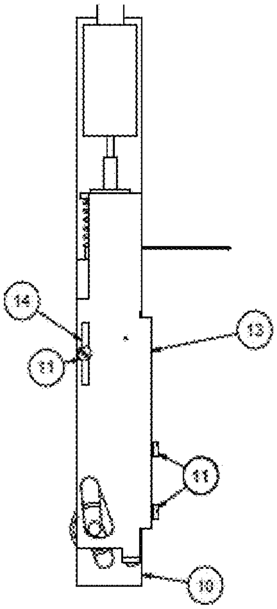
Figure 4D:
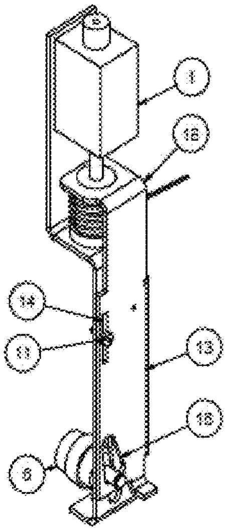
Figure 5A:
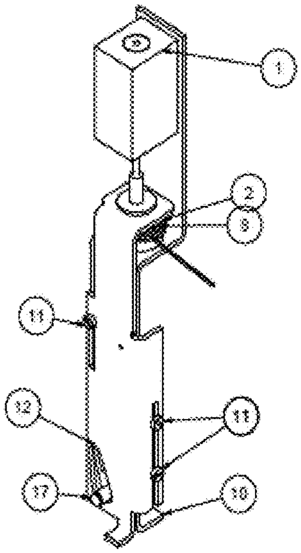
FIG. 5 shows different views of the activation system in roller non-interlock position.
Figure 5B:
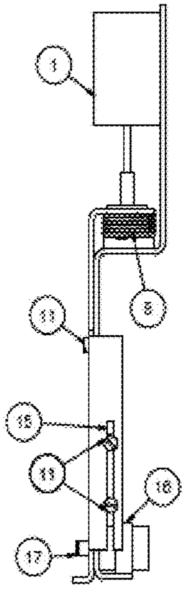
Figure 5C:
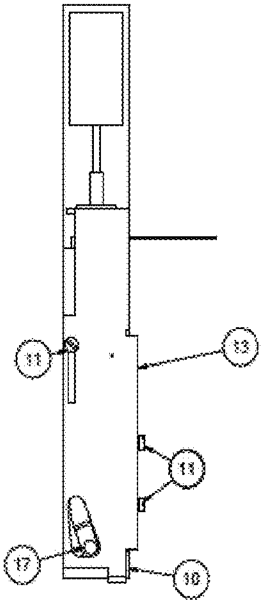
Figure 5D:
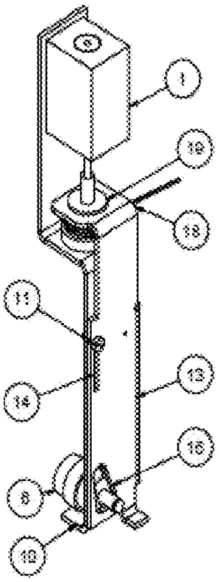
Figure 6A:
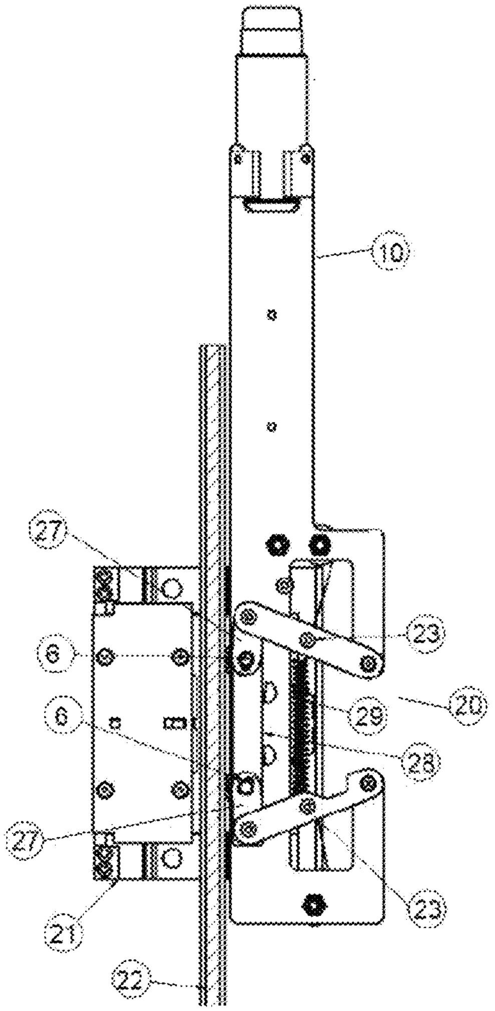
FIGS. 6A and 6B show a front view and rear view, respectively, of an electromechanical activation system for a two-way safety gear in a pre-interlock position.
Figure 6B:
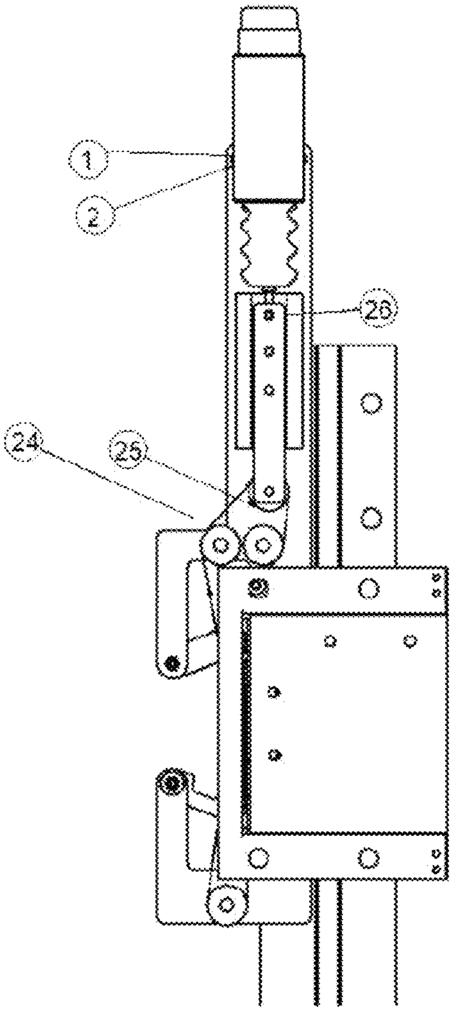
Figure 7A:
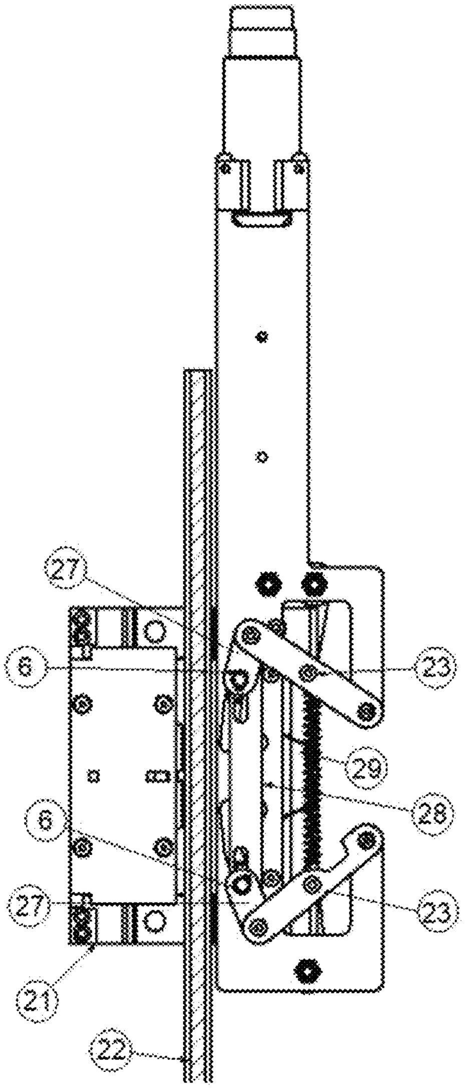
FIGS. 7A and 7B show a front view and rear view, respectively, of an electromechanical activation system for a two-way safety gear in a non-locking position.
Figure 7B:
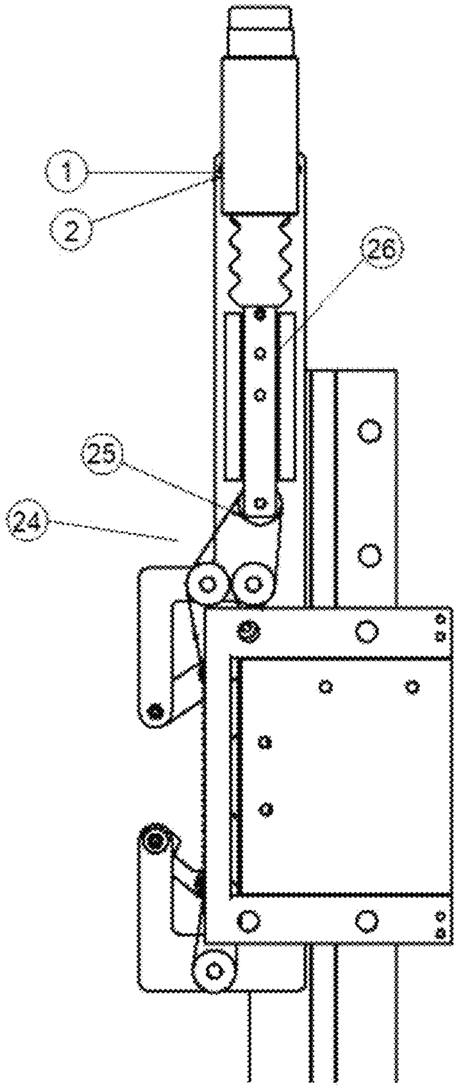
Figure 8A:
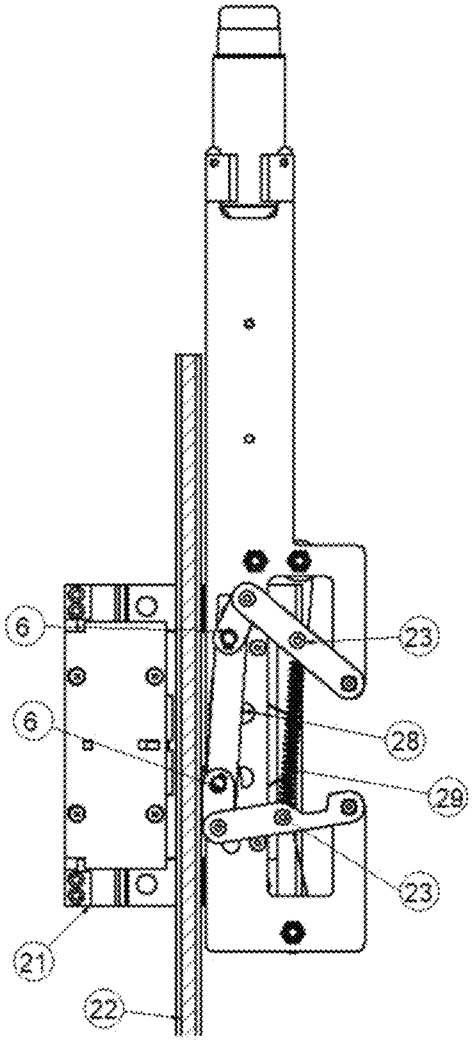
FIGS. 8A and 8B show a front view and rear view, respectively, of an electromechanical activation system for a two-way safety gear in a wedging position.
Figure 8B:
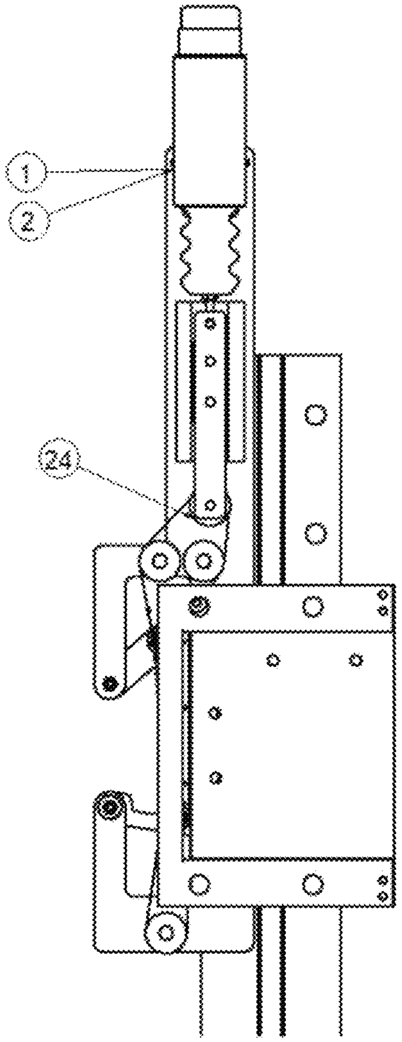

FIGS. 3 to 5 correspond with a first embodiment and show different views and states of the compact electromechanical activation system for a one-way safety gear of an elevator.

As observed in FIG. 3, the system comprises a fixed protective plate (10) provided with a double bend defining an upper part and a lower part, such that a reset coil (1) and a holding coil (2) are fixed in the upper part arranged in alignment and separated from one another, with an activation spring (8) being arranged on the holding coil (2), such that when the holding coil (2) is released from its power supply, the drive spring moves vertically.

In the lower part of the fixed protective plate (10) there is housed a wedging roller (6) (FIGS. 3 and 4) the guiding shaft (17) of which emerges through a guiding groove (12) made in the fixed protective plate (10).

FIGS. 4 and 5 shows the electromechanical activation system provided with a mobile protective plate (13) having an upper bend (18) which defines a horizontal surface (19), this horizontal surface (19) being housed between the space defined by the reset coil (1) and the holding coil (2).

The mobile protective plate (13) has guiding means for the vertical movement thereof with respect to the fixed protective plate (10); to that end, in the embodiment shown three guiding pins (11) are arranged on the fixed protective plate (10), whereas in the mobile protective plate there is a first guiding groove (14) through which a guiding pin (11) runs and a second guiding groove (15) through which two guiding pins (11) run, said guiding grooves (14) and (15) having a vertical arrangement for the purpose of producing a vertical movement of the mobile protective plate (13).

Furthermore, said mobile protective plate (13) has an elongated hole (16) having a section comparable to a trapezoid for the purpose of guiding the movement of the wedging roller (6) along the guiding groove (12) by means of the guiding shaft (17) of the wedging roller.

FIG. 4 shows the interlock position, in which when the holding coil (2) is deactivated, the activation spring (8) is released, causing the lifting of the mobile protective plate (13) by means of the horizontal surface (19), and accordingly, the lifting and existing movement of the wedging roller (6).

FIG. 5 shows the position of the activation system in the operating position, waiting to be activated, in which the activation spring (8) is compressed as a result of a first drive of the reset coil (1) and a subsequent drive of the holding coil (2), with the mobile protective plate (13) being in its lower position and, accordingly, with the wedging roller also being in its lower position and without laterally protruding.

FIGS. 6A, 6B, 7A, 7B, 8A and 8B show the front view and rear view of an electromechanical activation system in a second embodiment, corresponding with a pre-interlock position, non-locking position and wedging position, respectively, of a two-way safety gear.

Said figures show the fixed protective plate (10) where the drive means consisting of the reset coil (1) and the holding coil (2), which is a double solenoid coil in this embodiment, are assembled. Mobile wedging means (20) activated by the drive means are also located on said fixed protective plate (10), wherein these mobile wedging means are arranged in parallel with respect to the drive means.

Figure 9A:
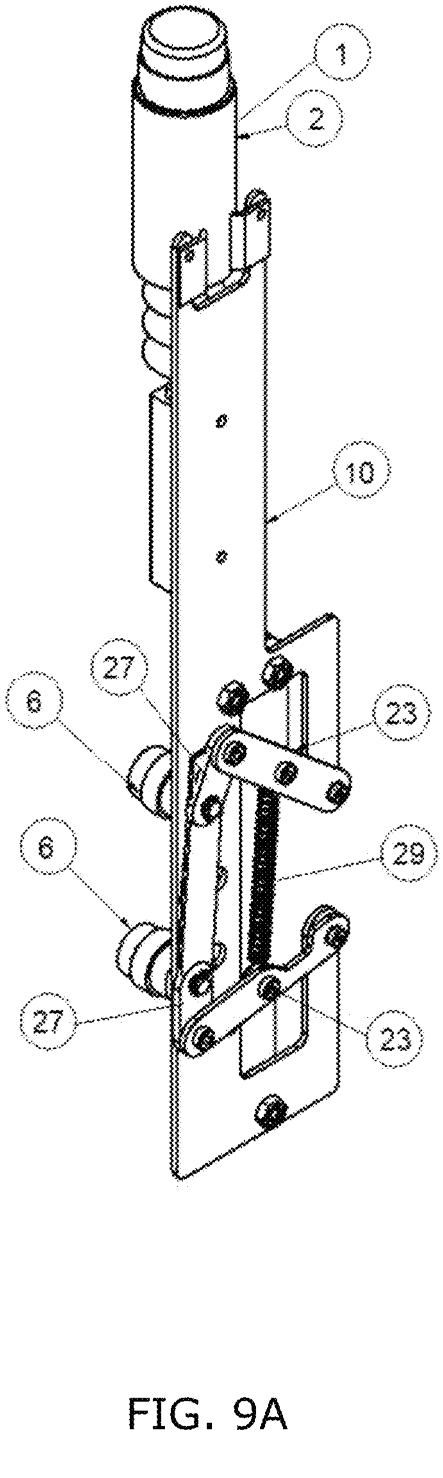
FIGS. 9A and 9B show the previous and subsequent views of the electromechanical activation system for a two-way safety gear in which the details of the system of the mobile wedging means, of the pivotable levers and of the pulley system and connecting ropes can be seen.
Figure 9B:
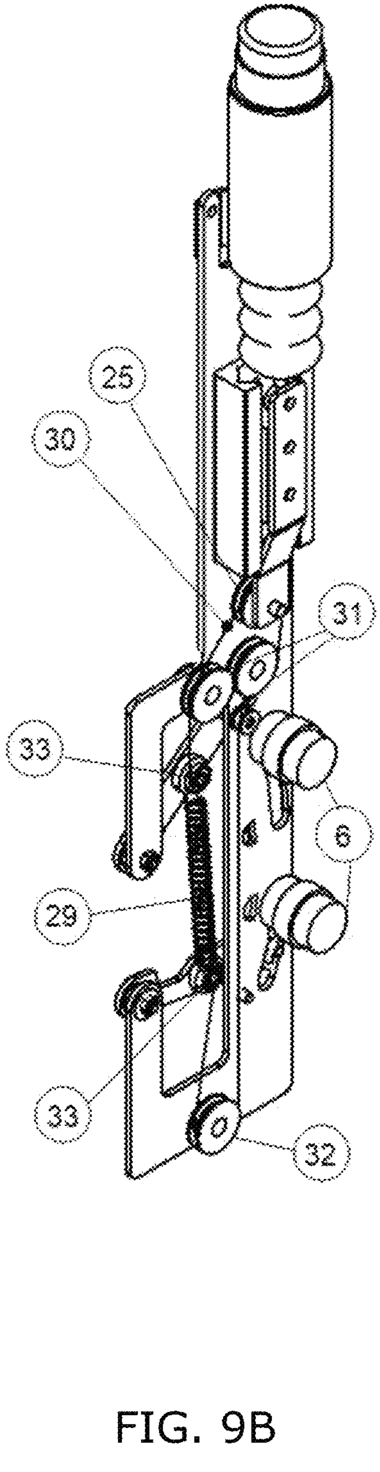

The drive means are connected with release means, which in the embodiment shown consist of a vertically movable core (26) which is connected at its lower end with a vertically movable pulley (25) of a pulley system (24), as observed in FIGS. 9A and 9B.

The mobile wedging means (20) comprise two pivotable levers (23) which pivot with respect to an intermediate point of their length, and which have at the free ends respective connection arms (27), wherein these connection means are in turn attached by means of a discrimination lever (28), with the wedging rollers (6) being assembled at the ends of the connection arms (27). Said pivotable levers (23) are furthermore attached to one another by means of a closing-in spring (29) fixed at the ends thereof at the pivoting or rotation points of the pivotable levers (23).

These figures show how the two-way safety gear (21) and the guide (22) of the elevator are contained in the same vertical plane of the electromechanical drive system object of the invention.

The mobile wedging means (20) are operated by a pulley system (24), comprising a vertically movable pulley (25), two first auxiliary pulleys (31), a second auxiliary pulley (32) and a rope (30) running through said pulleys and the ends of which are attached to the articulation or rotation points (33) of the pivotable levers (23), such that once the holding exerted by the holding coil (2) is released, the lifting of the movable core (26) and hence the lifting of the vertically movable pulley (25) take place, which translates into a pivoting of the pivotable levers (23) and, accordingly, the wedging rollers (6) moving closer together. That is, both rollers touch the guide (22); however, if the elevator car were to be moving downwards, then the lower roller would be wedged. If the car were to be moving upwards, then the upper roller would be wedged.

Figure 10A:
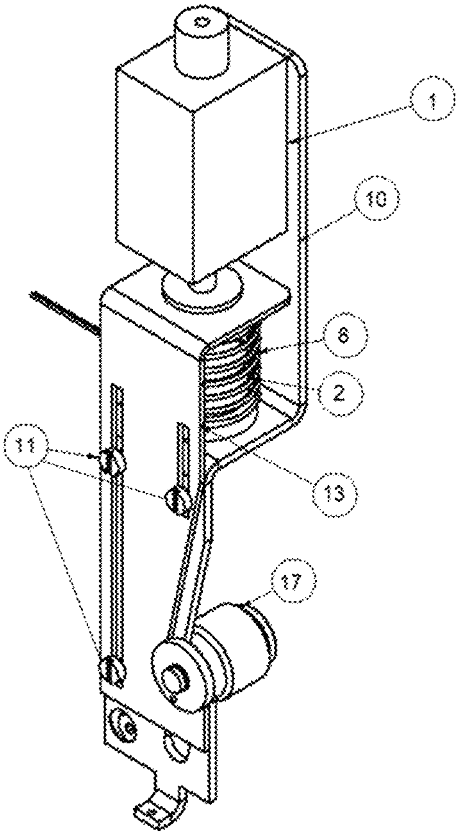
FIG. 10A shows the compact electromechanical activation system for instantaneous one-way safety gear.
Figure 10B:
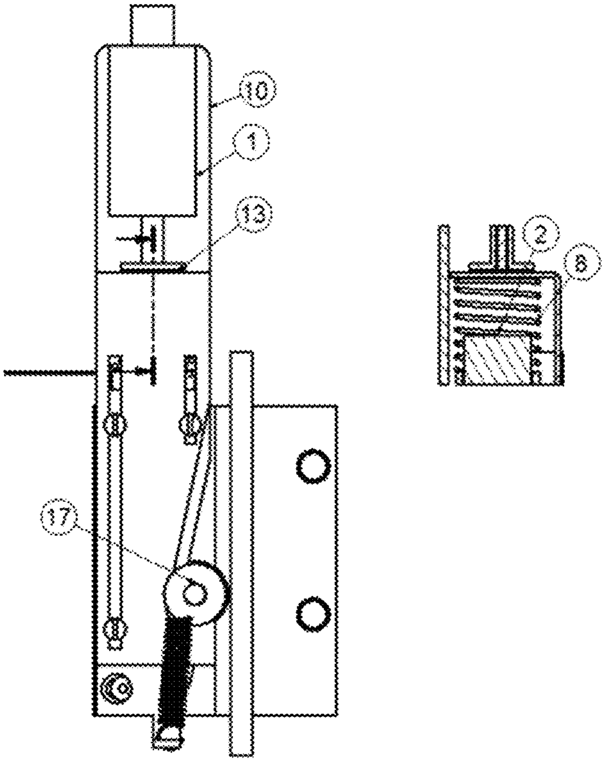
FIG. 10B shows the compact electromechanical activation system for instantaneous one-way safety gear in a locked state.
Figure 10C:
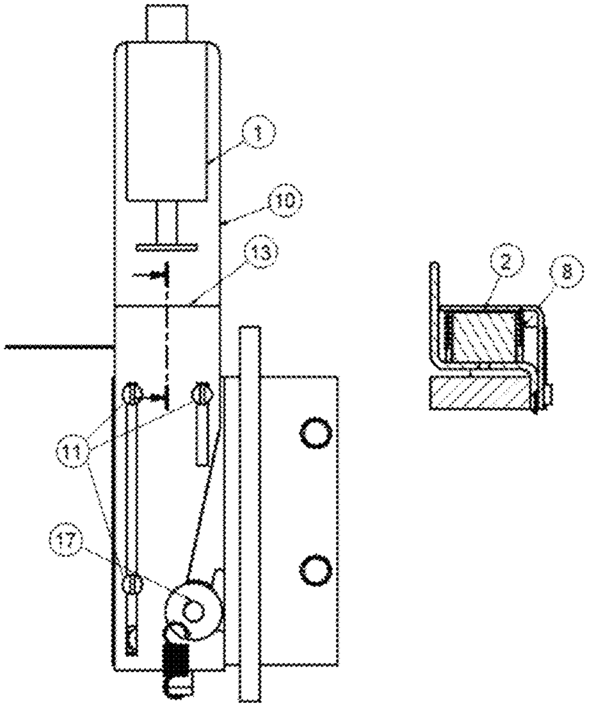
FIG. 10C shows the compact electromechanical activation system for instantaneous one-way safety gear in an unlocked state.

FIGS. 10A, 10B and 10C show the elements described above corresponding to a compact electromechanical activation system for instantaneous one-way safety gear, where the protective plate (FIG. 10A), the system in a locked state (FIG. 10B) and the system in an unlocked state (10C) can be seen. Having sufficiently described the nature of the present invention, as well as the way of putting same into practice, it is hereby stated that within its essential features, the invention may be carried out to practice in other embodiments differing in detail from the embodiment indicated by way of example and said other embodiments will also be covered under the protection that is sought provided that they do not alter, change or modify the fundamental principle of the invention.

The invention claimed is:

1. An electromechanical activation system for a safety gear of an elevator, comprising:

a fixed protective plate (10) comprising fixed drive means;

mobile wedging means activated by the drive means, and wherein the mobile wedging means are arranged in parallel with respect to the drive means;

one wedging rollers (6) for a one-way safety gear system, characterized in that the drive means fixed in the fixed protective plate (10) comprises a reset coil (1) and a holding coil (2) and release means aligned, the fixed protective plate (10) is provided with a double bend defining an upper part and a lower part, such that the reset coil (1) and the holding coil (2) are fixed in the upper part aligned and separated from one another, with an activation spring (8) being arranged on the holding coil (2), such that when the holding coil (2) is released, the activation spring moves vertically;

the mobile wedging means consist of a mobile protective plate (13) placed in a parallel arrangement with respect to the lower part of the fixed protective plate (10), wherein said mobile protective plate (13) has an upper bend which defines a horizontal surface (19), this horizontal surface being housed between the space defined by the reset coil and the holding coil, whereas a vertical segment has an elongated hole (16);

the wedging roller (6) is arranged in the lower part of the fixed protective plate (10), wherein said wedging roller has a guiding shaft (17) emerging through a guiding groove made in the fixed protective plate;

wherein the electromechanical activation system further comprises guiding means of the mobile protective plate (13) with respect to the fixed protective plate (10) for the vertical movement of the mobile protective plate with respect to the fixed protective plate.

2. The electromechanical activation system for the safety gear of an elevator according to claim 1, characterized in that the guiding means for the vertical movement of the mobile protective plate (13) with respect to the fixed protective plate (10) comprise three guiding pins (11) arranged in the fixed protective plate (10), whereas in the mobile protective plate there is a first guiding groove (14) through which a guiding pin (11) runs and a second guiding groove (15) through which two guiding pins (11) run, said guiding grooves (14) and (15) having a vertical arrangement for the vertical movement of the mobile protective plate (13).

3. The electromechanical activation system for the safety gear of an elevator according to claim 1, characterized in that the elongated hole (16) of the mobile protective plate (13) has a trapezoid shape.

* * * * *